(12) United States Patent
Yamada et al.

(10) Patent No.: US 10,589,597 B2
(45) Date of Patent: Mar. 17, 2020

(54) VEHICLE AIR CONDITIONER WITH AUXILIARY HEAT EXCHANGER

(71) Applicant: DENSO CORPORATION, Kariya, Aichi-pref. (JP)

(72) Inventors: Atsushi Yamada, Kariya (JP); Shin Nishida, Kariya (JP); Kota Sakamoto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/772,267

(22) PCT Filed: Oct. 28, 2016

(86) PCT No.: PCT/JP2016/081991
§ 371 (c)(1),
(2) Date: Apr. 30, 2018

(87) PCT Pub. No.: WO2017/077947
PCT Pub. Date: May 11, 2017

(65) Prior Publication Data
US 2018/0319244 A1    Nov. 8, 2018

(30) Foreign Application Priority Data

Nov. 3, 2015  (JP) ................................ 2015-216219
Sep. 28, 2016 (JP) ................................ 2016-189725

(51) Int. Cl.
*B60H 1/00* (2006.01)
*B60H 1/32* (2006.01)
*B60H 1/04* (2006.01)

(52) U.S. Cl.
CPC ......... *B60H 1/005* (2013.01); *B60H 1/00778* (2013.01); *B60H 1/00807* (2013.01);
(Continued)

(58) Field of Classification Search
CPC .... B60H 1/005; B60H 1/00778; B60H 1/3208
See application file for complete search history.

(56) References Cited

U.S. PATENT DOCUMENTS 5,209,081 A     5/1993  Matsuoka
5,299,431 A *  4/1994  Iritani ................ B60H 1/00021
                                                      62/243
(Continued)

FOREIGN PATENT DOCUMENTS

JP        59143716 A *  8/1984 ......... B60H 1/00007
JP      H04257715 A     9/1992
(Continued)

OTHER PUBLICATIONS

Translation of Japanese Patent Document JP59143716A entitled Translation-JP59143716A (Year: 2019).*

*Primary Examiner* — Paul Alvare
(74) *Attorney, Agent, or Firm* — Harness, Dickey & Pierce, P.L.C.

(57) ABSTRACT

A vehicle air conditioner includes a refrigeration cycle unit, a heater core, a cool air bypass passage, an air volume ratio regulator, and an auxiliary heat exchanger. The heater core is disposed in a heating passage located downstream of an evaporator with respect to an airflow. The auxiliary heat exchanger is provided in the refrigeration cycle unit. The evaporator includes a cold energy storage. The cold energy storage stores cold energy when the compressor is in operation, and dissipate cold energy while the compressor stops. The auxiliary heat exchanger is located downstream of the evaporator and upstream of the heater core with respect to the airflow. The auxiliary heat exchanger changes enthalpy of refrigerant by heat exchange between the refrigerant and air having been cooled by the evaporator and to be heated by the heater core.

8 Claims, 9 Drawing Sheets

(52) U.S. Cl.
CPC ..... *B60H 1/00878* (2013.01); *B60H 1/00964* (2013.01); *B60H 1/04* (2013.01); *B60H 1/322* (2013.01); *B60H 1/323* (2013.01); *B60H 1/3208* (2013.01); *B60H 1/3211* (2013.01); B60H 1/00321 (2013.01); B60H 2001/00957 (2013.01); *B60H 2001/327* (2013.01); *B60H 2001/3255* (2013.01); *B60H 2001/3288* (2013.01); *B60H 2001/3291* (2013.01); *Y02E 60/145* (2013.01)

(56) References Cited

U.S. PATENT DOCUMENTS

| | | | | |
|---|---|---|---|---|
| 5,355,689 | A | * | 10/1994 | Hara ................. B60H 1/00814 62/159 |
| 5,605,051 | A | * | 2/1997 | Iritani ................ B60H 1/3211 62/160 |
| 5,782,102 | A | * | 7/1998 | Iritani ................ B60H 1/00021 62/197 |
| 6,422,308 | B1 | * | 7/2002 | Okawara ............ B60H 1/00921 165/202 |
| 2002/0002837 | A1 | | 1/2002 | Shirota et al. |
| 2003/0102119 | A1 | * | 6/2003 | Takano .............. B60H 1/00735 165/202 |
| 2006/0259219 | A1 | * | 11/2006 | Wakiyama ............ B60H 1/005 701/36 |
| 2010/0065244 | A1 | | 3/2010 | Yokoyama et al. |
| 2010/0307180 | A1 | * | 12/2010 | Yamada ................ F25D 17/005 62/285 |
| 2015/0102118 | A1 | * | 4/2015 | Hirabayashi ........... B60H 1/004 237/12.3 R |
| 2015/0367711 | A1 | * | 12/2015 | Fuke .................. B60H 1/00764 62/133 |

FOREIGN PATENT DOCUMENTS

| | | |
|---|---|---|
| JP | H05008631 A | 1/1993 |
| JP | 2002154319 A | 5/2002 |
| JP | 2010091250 A | 4/2010 |
| JP | 2015009652 A | 1/2015 |

* cited by examiner

VEHICLE AIR CONDITIONER WITH AUXILIARY HEAT EXCHANGER

CROSS REFERENCE TO RELATED APPLICATIONS

This application is a U.S. National Phase Application under 35 U.S.C. 371 of International Application No. PCT/JP2016/081991 filed on Oct. 28, 2016 and published in Japanese as WO 2017/077947 A1 on May 11, 2017. This application is based on and claims the benefit of priority from Japanese Patent Applications No. 2015-216219 filed on Nov. 3, 2015, and No. 2016-189725 filed on Sep. 28, 2016. The entire disclosures of all of the above applications are incorporated herein by reference.

TECHNICAL FIELD

The present disclosure relates to a vehicle air conditioner that is configured to heat air cooled by an evaporator provided in an air conditioning duct, with use of a heater core provided downstream in an air flowing direction.

BACKGROUND ART

A vehicle air conditioner, which is configured to heat air cooled by an evaporator with use of a heater core to regulate temperature of conditioned air, has conventionally been known to execute an economical control in which refrigerant cooling temperature of the evaporator is increased to save power required by a compressor (see Patent Literature 1, for example).

The vehicle air conditioner includes a refrigeration cycle unit having a compressor driven by a vehicle travel engine. The refrigeration cycle unit thus stops upon start-stop stopping the engine while the vehicle temporarily stops. As already known, the refrigeration cycle unit includes an evaporator provided with a cold energy storage material storing cold energy for limited air cooling upon such start-stop (see Patent Literature 2, for example). Such an evaporator having a cold energy storage function is configured to cool blown air with the cold energy stored in the cold energy storage material while the engine stops and can thus have longer engine stop time.

When the evaporator having the cold energy storage function disclosed in Patent Literature 2 is adopted, decrease in refrigerant cooling temperature of the evaporator leads to shorter freezing time of the cold energy storage material and quick cold energy storage as a basic property required for the evaporator having the cold energy storage function. The refrigerant cooling temperature required for the economy control according to Patent Literature 1 and the refrigerant cooling temperature required by the evaporator having the cold energy storage function according to Patent Literature 2 are thus conflicting and may not be achieved simultaneously.

PRIOR ART DOCUMENT

Patent Document

Patent Literature 1: JP H4-257715 A
Patent Literature 2: JP 2010-91250 A

SUMMARY OF THE INVENTION

In view of this point, it is an object of the present disclosure to provide a vehicle air conditioner that includes an evaporator having a cold energy storage function and is configured to save power required for a vehicle.

A vehicle air conditioner according to an aspect of the present disclosure includes an air conditioning duct, a refrigeration cycle unit, a heater core, a cool air bypass passage, an air volume ratio regulator, an auxiliary heat exchanger. The refrigeration cycle unit includes a compressor, a condenser, a decompressor, and an evaporator. Air blown into a vehicle interior flows through the air conditioning duct. The compressor is configured to compress an intake refrigerant and discharge the compressed refrigerant. The condenser is configured to condense the refrigerant discharged from the compressor by heat exchange with outside air. The decompressor is configured to decompress the refrigerant in a liquid phase condensed by the condenser. The evaporator is disposed in the air conditioning duct and configured to cool the air flowing in the air conditioning duct by heat exchange with the refrigerant decompressed by the decompressor. The heater core is disposed in a heating passage located downstream of the evaporator in the air conditioning duct with respect to an airflow, the heater core being configured to heat the air cooled by the evaporator by heat exchange with a heat medium, the heat medium receiving heat from an internal combustion engine of the vehicle to cool the heat generating device. The cool air bypass passage is located downstream of the evaporator in the air conditioning duct with respect to the airflow, the air bypassing the heater core via the cool air bypass passage. The air volume ratio regulator is configured to regulate a ratio of a volume of air passing through the heating passage to a volume of air passing through the cool air bypass passage. The auxiliary heat exchanger is provided in the refrigeration cycle unit and configured to change enthalpy of refrigerant having flown out of the condenser and to flow into the evaporator by heat exchange. The compressor is driven by the internal combustion engine. The evaporator includes a cold energy storage configured to store cold energy, the cold energy storage being configured to store cold energy when the compressor is in operation, the cold energy storage being configured to dissipate cold energy while the compressor stops. The auxiliary heat exchanger is located downstream of the evaporator and upstream of the heater core in the air conditioning duct with respect to the airflow. The auxiliary heat exchanger is configured to change enthalpy of refrigerant, which is in the liquid phase having been condensed by the condenser and to be evaporated by the evaporator, by heat exchange between the refrigerant and air having been cooled by the evaporator and to be heated by the heater core.

This configuration synthesizes a fuel economy improving effect of the internal combustion engine by the evaporator having a cold energy storage function and an effect on power saving of the compressor by the auxiliary heat exchanger, to achieve an effect on improvement of fuel economy of the internal combustion engine at lower target cooling temperature of the evaporator. In other words, operating the vehicle air conditioner in a low target cooling temperature range ordinarily leading to low efficiency achieves both quick cold energy storage of the cold energy storage material in the evaporator and the fuel economy improving effect of the internal combustion engine.

EMBODIMENTS FOR EXPLOITATION OF THE INVENTION

Figure 1:
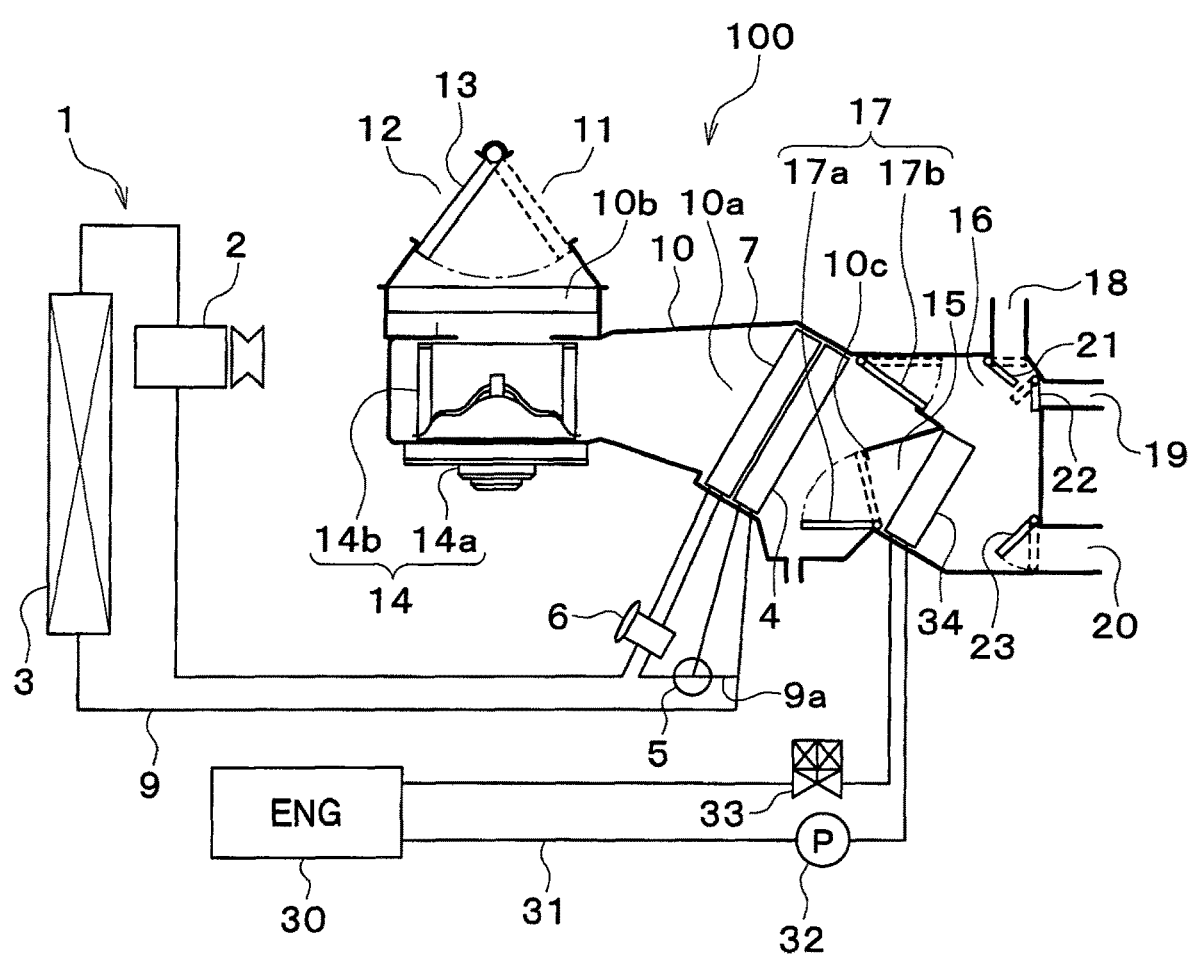
FIG. 1 is a schematic diagram illustrating a vehicle air conditioner according to a first embodiment of the present disclosure.

Hereinafter, multiple embodiments for implementing the present disclosure will be described referring to drawings. In the respective embodiments, a part that corresponds to a matter described in a preceding embodiment may be assigned the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

(First Embodiment)

A first embodiment of the present disclosure will now be described with reference to FIGS. 1 to 12.

FIG. 1 depicts a vehicle air conditioner 100 that is mounted on a vehicle including an engine 30 functioning as a travel internal combustion engine or the like and is configured to condition air of vehicle interior. The vehicle according to the present embodiment adopts start-stop control of stopping an engine while a vehicle temporarily stops. The start-stop control achieves fuel economy improvement by stopping the engine while the vehicle stops.

The engine 30 is the internal combustion engine mounted on the vehicle and generates heat. Examples of the vehicle equipped with the vehicle air conditioner 100 include a hybrid vehicle including the engine 30 as well as a travel electric motor.

Figure 4:
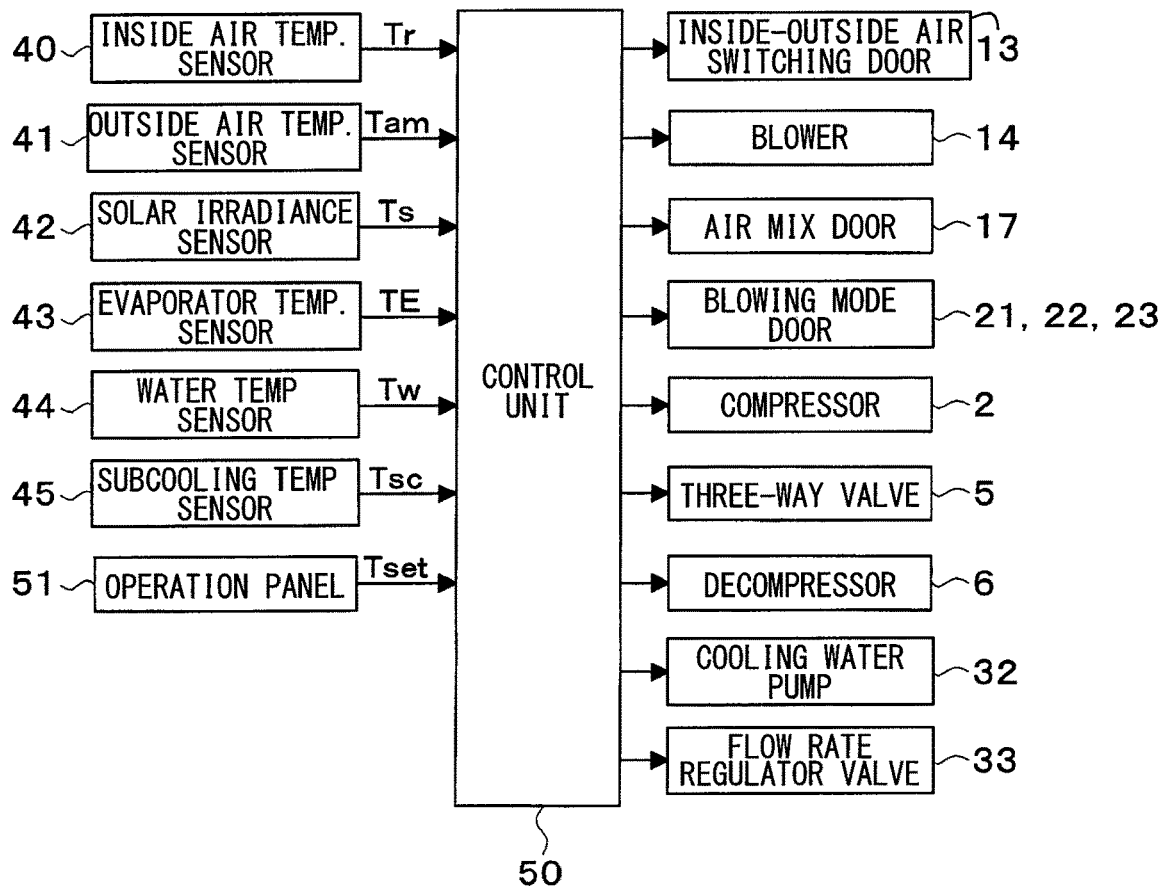
FIG. 4 is a block diagram illustrating a electric control unit of the vehicle air conditioner according to the first embodiment.

As depicted in FIG. 1, the vehicle air conditioner 100 includes an air conditioning duct 10, a blower 14, a refrigeration cycle unit 1, a cooling water circuit 31, an air conditioning control unit 50 depicted in FIG. 4, for example.

The air conditioning duct 10 defines therein an air passage 10a that guides conditioned air flowing to the vehicle interior. The air conditioning duct 10 is disposed adjacent to a front portion in the vehicle interior. In the most upstream part of the air conditioning duct 10, an inside air inlet 11 taking in air of the vehicle interior (hereinafter, also referred to as inside air) and an outside air inlet 12 taking in air outside the vehicle (hereinafter, also referred to as outside air). The inside air inlet 11 and the outside air inlet 12 constitute an inside-outside air switching box.

The inside air inlet 11 and the outside air inlet 12 are provided therein with an inside-outside air switching door 13 that is tunable. The inside-outside air switching door 13 is driven by an actuator such as a servomotor and is configured to switch among air inlet modes including an inside air circulation mode and an outside air import mode. The inside-outside air switching door 13 functions as an inside-outside air switcher.

In the most downstream part of the air conditioning duct 10, a defogger opening, a face opening, and a foot opening that constitute an air outlet switching box. The defogger opening is connected with a defogger duct. The defogger duct has a most downstream end provided with a defogger air outlet 18 allowing typically hot air to blow toward an inside of a windshield of the vehicle. The face opening is connected with a face duct. The face duct has a most downstream end provided with a face air outlet 19 allowing typically cool air to blow toward a head and a chest of an occupant. The foot opening is connected with a foot duct. The foot duct has a most downstream end provided with a foot air outlet 20 allowing typically hot air to blow toward feet of the passenger.

The air outlets 18, 19, 20 are provided therein with a defogger door 21, a face door 22, and a foot door 23, respectively, that are turnable to open and close the corresponding openings. These doors 21, 22, 23 are each driven by an actuator such as a servomotor. These doors 21, 22, 23 are configured to switch among air outlet modes including a face mode, a bi-level mode, a foot mode, a foot defogger mode, and a defogger mode. The defogger door 21, the face door 22, and the foot door 23 function as blowing mode switchers.

The blower 14 constitutes a blower unit configured to generate an airflow in the air conditioning duct 10. The blower 14 includes a motor 14a and a fan 14b. The motor 14a has rotational speed determined in accordance with voltage applied to the motor 14a. The blower 14 has an air blowing amount controlled by control of the voltage applied to the motor 14a according to a control signal transmitted from air conditioning control unit 50.

In the air conditioning duct 10, a filter member 10b catching foreign matter in the air flowing in the air passage 10a is located between the inside-outside air switching box and the blower 14.

The refrigeration cycle unit 1 includes a compressor 2, a condenser 3, a subcooling heat exchanger 4, a three-way valve 5, a decompressor 6, an evaporator 7, and a loop refrigerant pipe 9 connecting the compressor 2 to the evaporator 7. The compressor 2 compresses intake refrigerant and discharges the compressed refrigerant. The condenser 3 condenses to liquefy the refrigerant discharged from the compressor 2 by heat exchange with outside air.

The subcooling heat exchanger 4 exchanges heat between the liquid-phase refrigerant condensed by the condenser 3 and air having passed through the evaporator 7, and accordingly the liquid-phase refrigerant is further cooled. The refrigerant heats air passing through the subcooling heat exchanger 4 to increase temperature thereof.

The three-way valve 5 functions as a refrigerant flow path switcher configured to selectively switch a flow path of the refrigerant flowing out of the compressor 2 between the subcooling heat exchanger 4 and a refrigerant bypass passage 9a bypassing the subcooling heat exchanger 4. When the subcooling heat exchanger 4 heats air, the three-way valve 5 supplies the subcooling heat exchanger 4 with refrigerant. In a max cool control maximizing air cooling performance of the evaporator 7, the three-way valve 5 switches the refrigerant flow path to the refrigerant bypass passage 9a. This stops refrigerant from flowing from the compressor 2 into the subcooling heat exchanger 4 and inhibits increase in temperature of blowing-out air by the subcooling heat exchanger 4.

The decompressor 6 decompresses and expands the liquid-phase refrigerant cooled by the subcooling heat exchanger 4. The evaporator 7 evaporates and vaporizes the refrigerant decompressed by the decompressor 6. The decompressor 6 exemplarily includes a temperature sensing unit that has a displacement member (e.g. a diaphragm) displaced in accordance with temperature and pressure of the refrigerant flowing out of the evaporator 7, and the decompressor 6 mechanically regulates a valve opening degree in accordance with displacement of the displacement member.

The compressor 2 is provided in a vehicle engine room and driven by driving power of the engine 30, for example. Upon start-stop control stopping the engine while the vehicle stops, the compressor 2 stops and the refrigeration cycle unit 1 stops. Start-stop control can thus also be called compressor stop control.

The vehicle air conditioner 100 according to the present embodiment can be operated even in start-stop control. Conditioned air blows to the vehicle interior with the compressor 2 being stopped in start-stop control.

The condenser 3 is provided ahead of the vehicle engine room, for example, to be likely to receive an airflow generated by vehicle travel, and functions as an outdoor heat exchanger configured to exchange heat between refrigerant flowing inside and outside air blown by an outdoor fan (not depicted).

The refrigeration cycle unit 1 optionally includes a gas-liquid separator or the like between the condenser 3 and the subcooling heat exchanger 4. The gas-liquid separator separates the refrigerant flowing out of the condenser 3 into gas and liquid, allows only the liquid-phase refrigerant to flow downstream, and reserves excess refrigerant therein. In a case where the condenser 3 is a so-called subcooling condenser including a condensing portion and a subcooling portion, the gas-liquid separator can be provided between the condensing portion and the subcooling portion of the condenser 3. The subcooling heat exchanger 4 is an auxiliary heat exchanger configured to exchange heat to change enthalpy of the refrigerant that has flown out of the condenser 3 and is to flow into the evaporator 7.

The cooling water circuit 31 is a heat carrier circuit connecting the engine 30 and a heater core 34 and is configured to circulate, by means of an electric cooling water pump 32 or the like, cooling water heated by a water jacket of the engine 30. The cooling water circuit 31 is connected with a radiator, a thermostat, and the like (not depicted) in parallel with the heater core 34.

Cooling water that is a heat carrier, which receives heat from the engine 30 and cools the engine 30, flows through the heater core 34. The heater core 34 heats air flowing in the air conditioning duct 10 with use of the cooling water as a heat source for air heating. The cooling water circuit 31 is provided with the cooling water pump 32 and a flow rate regulator valve unit 33. At least one of the cooling water pump 32 and the flow rate regulator valve unit 33 functions as a flow rate regulator configured to regulate a flow rate of cooling water circulating in the cooling water circuit 31. The flow rate regulator valve unit 33 may not be provided when the cooling water pump 32 functions as the flow rate regulator.

In the air passage 10a in the air conditioning duct 10, the evaporator 7, the subcooling heat exchanger 4, and the heater core 34 are located downstream in the air flowing direction of the blower 14 in the mentioned order from an upstream side to a downstream side.

The evaporator 7 is disposed across the entire passage immediately downstream of the blower 14. The evaporator 7 is configured to allow entire air blowing out of the blower 14 to pass therethrough. The evaporator 7 functions as an indoor heat exchanger configured to exert an air cooling effect of exchanging heat between refrigerant flowing inside and air flowing in the air passage 10a to cool the air and an air dehumidifying effect of dehumidifying air passing through the evaporator 7. The evaporator 7 has a cold energy storage function of storing cold (thermal) energy.

Figure 2:
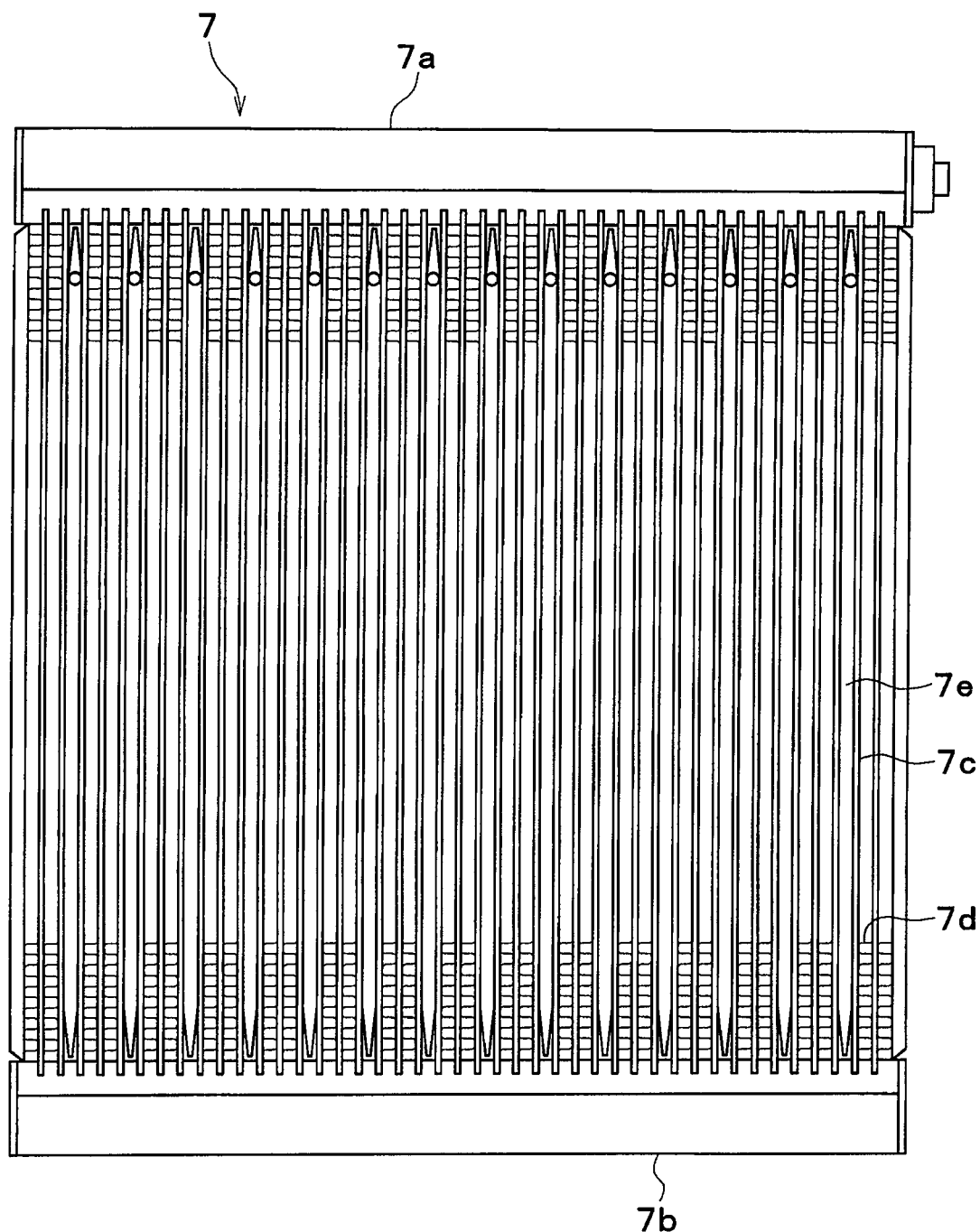
FIG. 2 is a front view illustrating an evaporator according to the first embodiment.

As depicted in FIG. 2, the evaporator 7 includes a pair of header tanks 7a and 7b, and multiple tubes 7c connecting the header tanks 7a and 7b. The pair of header tanks 7a and 7b is disposed in parallel with each other and apart from each other by a predetermined distance. Multiple tubes 7c are disposed between the header tanks 7a and 7b to be equally distant from each other. Each of the tubes 7c has ends each communicating with the interior of corresponding one of the header tanks 7a and 7b.

Multiple tubes 7c has a plurality of gaps therebetween. The plurality of gaps accommodates multiple fins 7d and multiple cold energy storage material containers 7e. Multiple fins 7d and multiple cold energy storage material containers 7e are disposed to have predetermined regularity, for example.

Each of the tubes 7c has a flat shape and is a perforated pipe having multiple inner refrigerant passages. The tubes 7c can be produced through extrusion or the like. Multiple refrigerant passages extends in a longitudinal direction of the tube 7c and is opened to the both ends of the tube 7c.

The evaporator 7 includes the fins 7d for increase in contact area with air supplied to the vehicle interior. The fins 7d are each disposed in an air passage defined between the two tubes 7c adjacent to each other. The fins 7d are each thermally connected with the two adjacent tubes 7c. The fins 7d are each brazed to the two adjacent tubes 7c. Each of the fins 7d is formed by corrugating a thin metal plate made of aluminum or the like, for example.

The cold energy storage material containers 7e are each disposed between the two tubes 7c adjacent to each other. The cold energy storage material containers 7e are made of metal such as aluminum. The cold energy storage material containers 7e are each thermally connected with the two tubes 7c disposed on the both sides. The cold energy storage material containers 7e according to the present embodiment are brazed to the tubes 7c.

The cold energy storage material containers 7e each accommodate a cold energy storage material. Examples of the cold energy storage material include paraffin having a freezing point of about 10 degrees Celsius. The evaporator 7 is a cold energy storage heat exchanger configured to freeze the cold energy storage material and store cold energy when evaporating refrigerant to exert an endothermic effect.

The evaporator 7 stores cold energy in the cold energy storage material while the compressor 2 is in operation. The evaporator 7 dissipates cold energy from the cold energy storage material when the engine 30 stops to stop the compressor 2. The cold energy storage material thus cools air even when the refrigeration cycle unit 1 temporarily stops. When temperature of the air flowing out of the evaporator 7 exceeds predetermined temperature (e.g. 15 degrees Celsius), the engine 30 restarts to start the compressor 2.

The cold energy storage function of the evaporator 7 achieves longer stop time of the compressor 2 for a higher power saving effect of the compressor 2. Such longer stop time of the compressor 2 leads to longer stop time of the engine 30 for a higher fuel economy improving effect of the engine 30.

With reference to FIG. 1 again, the air passage 10a has the subcooling heat exchanger 4 located downstream of the evaporator 7 with respect to the flow of the air. The subcooling heat exchanger 4 is disposed across the entire passage immediately downstream of the evaporator 7. The subcooling heat exchanger 4 and the evaporator 7 are disposed next to each other such that core surfaces are in parallel with each other. The subcooling heat exchanger 4 is configured to allow entire air blowing out of the evaporator 7 to pass therethrough.

The subcooling heat exchanger 4 is located, in the air conditioning duct 10, downstream of the evaporator 7 and upstream of the heater core 34 in the flow of the air. The subcooling heat exchanger 4 changes enthalpy of the liquid-phase refrigerant, which has been condensed by the condenser 3 and is to be evaporated by the evaporator 7, by heat exchange with air, which has been cooled by the evaporator 7 and is to be heated by the heater core 34. The subcooling heat exchanger 4 is configured to exchange heat between refrigerant cooled by the condenser 3 and air cooled by the evaporator 4 to further cool the refrigerant for a higher subcooling degree of the refrigerant.

Figure 3:
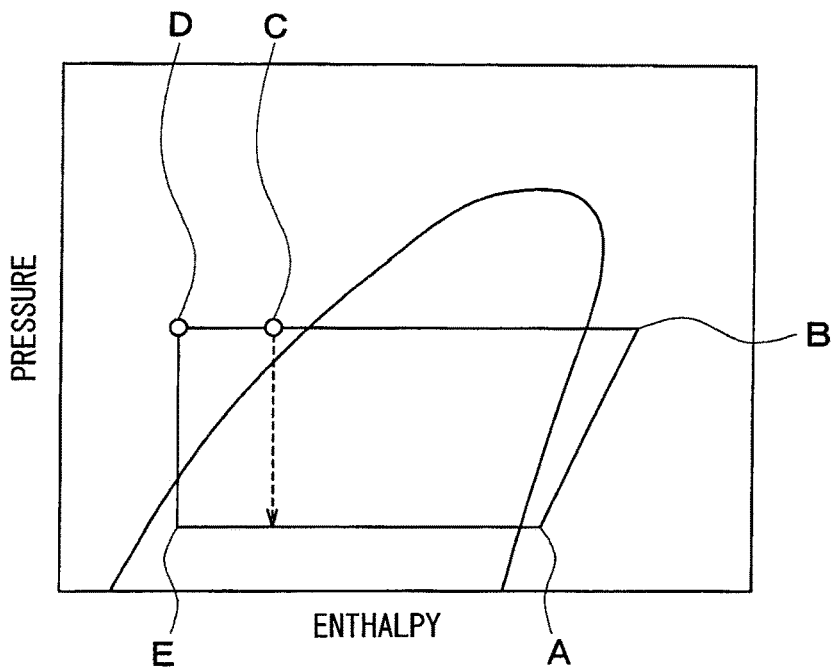
FIG. 3 is a Mollier chart indicating change of a condition of refrigerant in a refrigeration cycle unit according to the first embodiment.

As shown in FIG. 3 illustrating a state of refrigerant in the refrigeration cycle unit 1, gas-phase refrigerant increased in pressure and enthalpy from a point A to a point B through compression by the compressor 2 is heat dissipated and condensed by the condenser 3. Assuming that the refrigerant flowing out of the condenser 3 is in a state at a point C, the refrigerant flowing out of the subcooling heat exchanger 4 is in a state at a point D. In other words, the refrigerant is significantly decreased in enthalpy by the subcooling heat exchanger 4 before being decompressed by the decompressor 6. This secures a large difference in enthalpy between the refrigerant flowing into the evaporator 7 and the refrigerant flowing out of the evaporator 7 (i.e. a difference between the point A and a point E in FIG. 3) for significant improvement in air cooling performance and operation efficiency COP of the refrigeration cycle unit 1. A dashed line in FIG. 3 indicates a cycle of a comparative example in which the subcooling heat exchanger 4 is not provided.

The condenser 3 has refrigerant condensation temperature that is higher by 10 degrees Celsius to 20 degrees Celsius than outside air temperature, for example, and is about 45 degrees Celsius to 55 degrees Celsius when the outside air temperature is 35 degrees Celsius. In the case where the condenser 3 is the so-called subcooling condenser, the refrigerant flowing out of the condenser 3 is 35 degrees Celsius to 45 degrees Celsius, which is lower by about 10 degrees Celsius than the condensation temperature. Assuming, on a Mollier chart, that the condensation temperature is 50 degrees Celsius, the subcooling portion of the condenser 3 subcools by 10 degrees Celsius, and the evaporator 7 has temperature at 0 degrees Celsius, the efficiency COP of the refrigeration cycle unit 1 according to the present embodiment is 5.99 when the subcooling heat exchanger 4 decreases the temperature of the refrigerant to 10 degrees Celsius. In contrast, the efficiency COP of the refrigeration cycle unit 1 not including the subcooling heat exchanger 4 is 4.43. The refrigeration cycle unit 1 according to the present embodiment thus achieves significant improvement in efficiency. The above results are theoretical efficiency assuming the refrigerant is R1234yf and compression efficiency and volumetric efficiency are one.

With reference to FIG. 1 again, the air passage 10a branches into two passages at a branching point 10c located downstream of the evaporator 7 in the flow of the air. The air passage 10a branches, downstream in the air flowing direction of the branching point 10c, into a heating passage 15 and a cool air bypass passage 16. The heater core 34 is provided in the heating passage 15. The heater core 34 is disposed across the entire heating passage.

The cool air bypass passage 16 is a passage through which the air bypasses the heater core 34. An air mix door 17 is provided around the branching point 10c at which the passage branches into the heating passage 15 and the cool air bypass passage 16. The air mix door 17 according to the present embodiment includes a first door 17a configured to regulate an opening degree of an upstream end opening of the heating passage 15 and a second door 17b configured to regulate an opening degree of an upstream end opening of the cool air bypass passage 16.

The air mix door 17 functions as an air volume ratio regulator configured to regulate an air volume ratio between air passing through the heating passage 15 and air passing through the cool air bypass passage 16. The air mix door 17, which includes a door body displaced by an actuator or the like, functions as a temperature regulator configured to regulate air distribution downstream of the evaporator 7 in the air conditioning duct 10 to regulate temperature of air blowing to the vehicle interior.

The air volume ratio regulator is provided as the air mix door 17 in the present embodiment, but is not limited thereto. The air volume ratio regulator has only to control distribution of air to the passages 15 and 16. For example, temperature of main conditioned air can be regulated through opening degree regulation of the first door 17a and flow rate regulation of circulating cooling water by the flow rate regulator, and the second door 17b can be opened if cool air needs to be mixed with hot air from the heating passage 15. For example, in a case where a large volume of cool air needs to blow to the vehicle interior, the second door 17b is controlled to open to allow cool water to blow mainly from the face air outlet 19.

A cool and hot air mixing space in which hot air from the heating passage 15 and cool air from the cool air bypass passage 16 are mixed is located downstream of the heating passage 15 and the cool air bypass passage 16. The defogger opening, the face opening, and the foot opening are formed to face the cool and hot air mixing space and allow air from the cool and hot air mixing space to flow into the openings.

A control system according to the present embodiment will be described next with reference to FIG. 4. The air conditioning control unit 50 receives switch signals from switches and sensor signals from sensors and a temperature setting switch on an operation panel 51 at a front end of the vehicle interior.

As depicted in FIG. 4, the sensors include an inside air temperature sensor 40, an outside air temperature sensor 41, a solar irradiance sensor 42, an evaporator temperature sensor 43, a water temperature sensor 44, a subcooling temperature sensor 45, for example. The inside air temperature sensor 40 detects an air temperature Tr of the vehicle interior (hereinafter, also referred to as inside air temperature). The outside air temperature sensor 41 detects an air temperature Tam outside the vehicle (hereinafter, also referred to as outside air temperature). The solar irradiance sensor 42 detects a solar irradiance amount Ts of the vehicle interior. The evaporator temperature sensor 43 detects a cooling temperature TE of air cooled by the evaporator 7. The water temperature sensor 44 detects a temperature Tw of cooling water (hereinafter, also referred to as cooling water temperature) flowing into the heater core 34. The subcooling temperature sensor 45 detects outer surface temperature of the subcooling heat exchanger 4 or a temperature Tsc of air heated by the subcooling heat exchanger 4.

The air conditioning control unit 50 is provided therein with a microcomputer including a CPU, a ROM, a RAM, and the like (not depicted). The sensor signals from the sensors 40 to 45 are A/D converted by an input circuit (not depicted) provided in the air conditioning control unit 50 and are then inputted to the microcomputer.

The air conditioning control unit 50 functioning as a controller of the present embodiment is configured to control operation of target devices through a procedure described later, in accordance with signals received from the switches on the operation panel 51, signals received from the sensors 40 to 45, and the like. Examples of the target devices include the inside-outside air switching door 13, the blower 14, the air mix door 17, the blowing mode doors 21 to 23, the compressor 2, the three-way valve 5, the decompressor 6, the cooling water pump 32, and the flow rate regulator valve unit 33. In a case where the decompressor 6 is an expansion valve unit configured to sense refrigerant temperature, for example, the air conditioning control unit 50 does not control operation of the decompressor 6. Any type of air conditioning control unit 50 is acceptable as long as it controls operation of at least one of the cooling water pump 32 and the flow rate regulator valve unit 33 configuring the flow rate regulator. The flow rate regulator according to the present embodiment includes the air conditioning control unit 50 and at least one of the cooling water pump 32 and the flow rate regulator valve unit 33.

Figure 5:
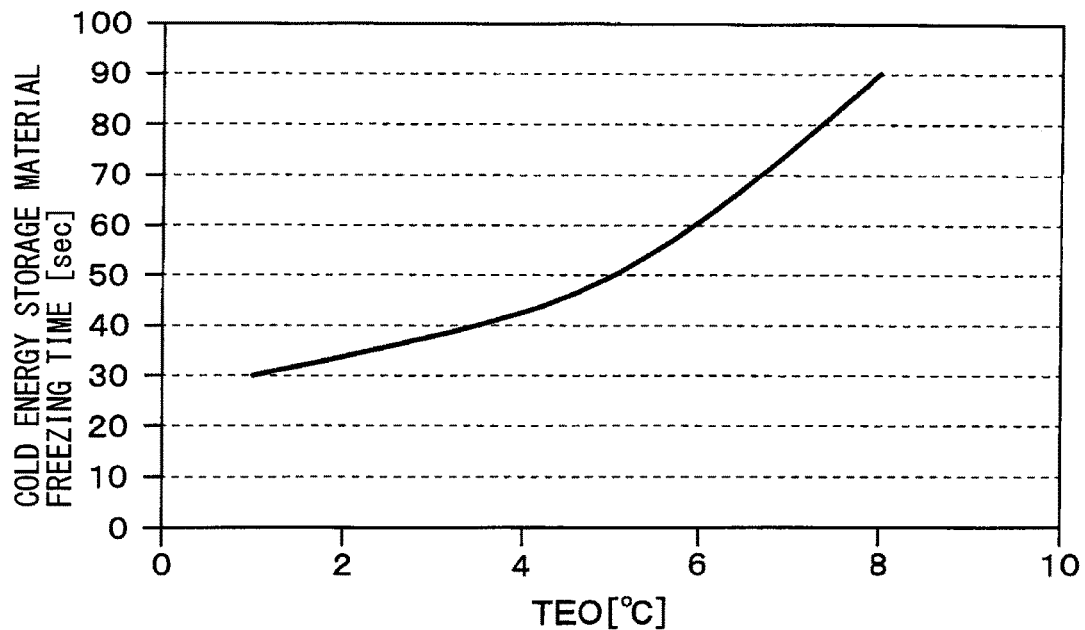
FIG. 5 is a graph illustrating relationships between a target cooling temperature TEO and a cold energy storage according to the first embodiment.

A relationship between a target cooling temperature TEO of air cooled by the evaporator 7 and freezing time of the cold energy storage material of the evaporator 7 will be described with reference to FIG. 5. In FIG. 5, it is assumed that air entering the evaporator 7 has temperature at 28 degrees Celsius, humidity at 35%, and a flow rate at 180 m3/h. As shown in FIG. 5, as the target cooling temperature TEO is lower, a temperature difference between the freezing point of the cold energy storage material and the target cooling temperature TEO is large, and accordingly freezing time of the cold energy storage material becomes shorter.

Figure 6:
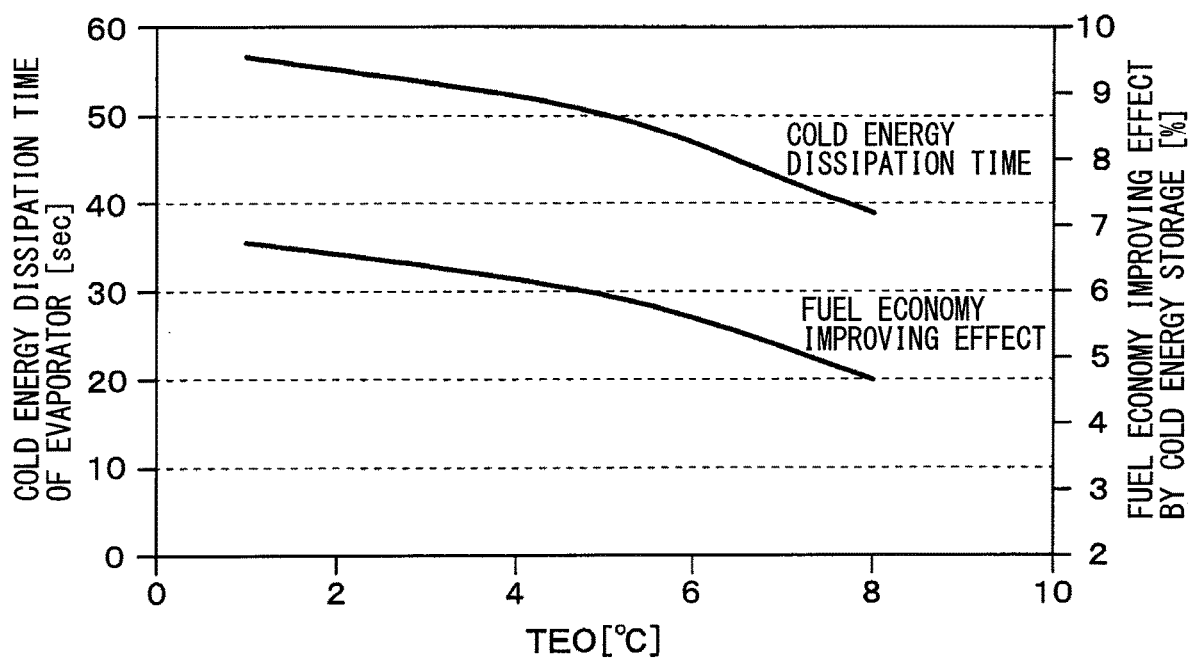
FIG. 6 is a graph illustrating relationships between the target cooling temperature TEO, a cold energy dissipation time of the evaporator after engine stops and, a fuel economy improving effect of the vehicle according to the first embodiment.

The fuel economy improving effect of the evaporator 7 having the cold energy storage function will be described with reference to FIG. 6. FIG. 6 indicates relationships between the target cooling temperature TEO, cold energy dissipation time due to the cold energy storage function of the evaporator 7 after the engine stops, and the effect on improvement of the fuel economy of the engine 30. FIG. 6 indicates the fuel economy improving effect in a Japanese urban district travel pattern of a practical vehicle, which is automatically air conditioned, under the conditions where outside air temperature is at 30 degrees Celsius, humidity is at 50%, and solar irradiance is at 500 W/m2. The fuel economy improving effect shown in FIG. 6 is a value disregarding power consumed by the compressor 2 during refrigeration cycle operation but relating only to an engine stop time extension effect exerted by the evaporator 7 including the cold energy storage material.

The lower the target cooling temperature TEO is, the more the evaporator 7 is likely to use all of latent heat of the cold energy storage material, and the cold energy storage material has larger sensible heat as the target cooling temperature TEO is lower. As indicated in FIG. 6, as the target cooling temperature TEO is lower, the evaporator 7 has longer cold energy dissipation time after the engine stops (i.e. after the compressor 2 stops). The compressor 2 can thus stop longer as the target cooling temperature TEO is lower. This limits the engine 30 from restarting due to increase in blowing air temperature, and accordingly fuel economy improving effect can be improved.

Figure 7:
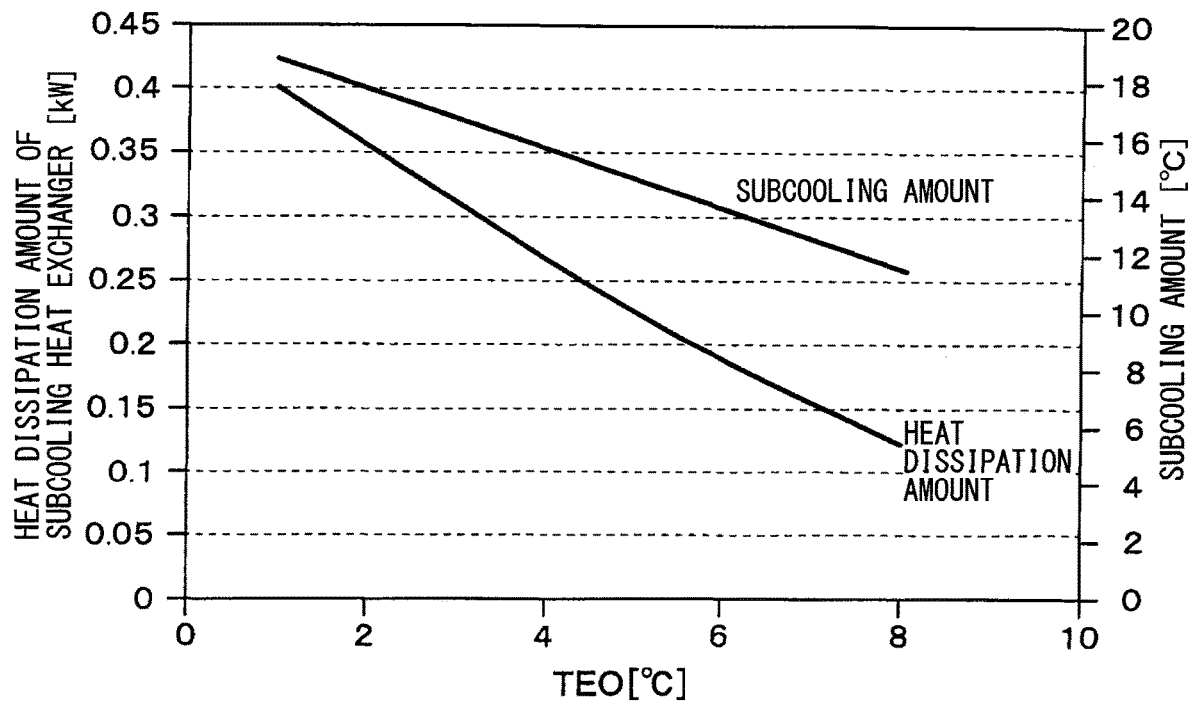
FIG. 7 is a graph illustrating relationships between the target cooling temperature TEO, a heat dissipation amount, and a subcooling amount of a subcooling heat exchanger according to the first embodiment.

An effect on improvement of efficiency of the refrigeration cycle by the subcooling heat exchanger 4 will be described next with reference to FIG. 7. FIG. 7 indicates relations of the target cooling temperature TEO to a heat dissipation amount of refrigerant and a subcooling amount (i.e. a subcooling degree) of liquid-phase refrigerant in the subcooling heat exchanger 4. In FIG. 7, it is assumed that air entering the evaporator 7 has temperature at 28 degrees Celsius, humidity at 35%, and a flow rate at 180 m3/h. As described above, the subcooling heat exchanger 4 is configured to exchange heat between air cooled by the evaporator 7 and liquid-phase refrigerant condensed by the condenser 3. As the target cooling temperature TEO is lower, heat dissipation amount of the liquid-phase refrigerant in the subcooling heat exchanger 4 is increased, and accordingly subcooling amount of the liquid-phase refrigerant is increased. That is, the subcooling heat exchanger 4 improves the efficiency COP of the refrigeration cycle 1 at the low target cooling temperature TEO.

Figure 8:
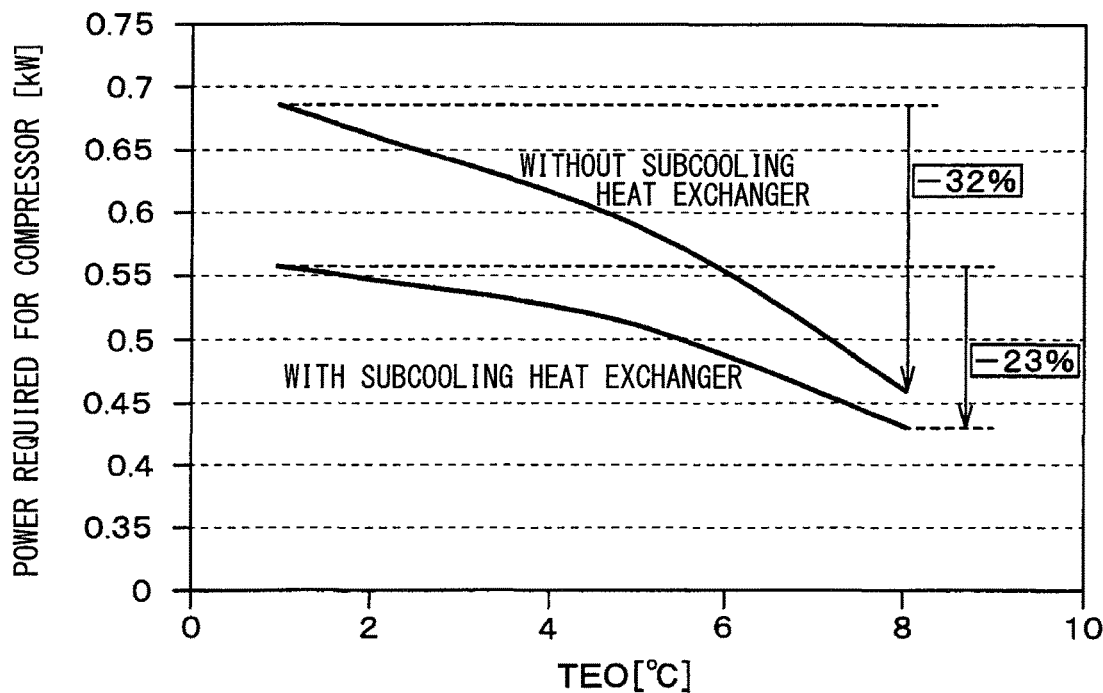
FIG. 8 is a graph illustrating relationships between the target cooling temperature TEO and power required by a compressor according to the first embodiment.

Effects of the subcooling heat exchanger 4 on the power required by the compressor 2 will be described next with reference to FIG. 8. FIG. 8 indicates variation in power required by the compressor 2 upon economy control of increasing the target cooling temperature TEO in each of the vehicle air conditioner including the subcooling heat exchanger 4 and a vehicle air conditioner not including the subcooling heat exchanger 4. In FIG. 8, it is assumed that air entering the evaporator 7 has temperature at 28 degrees Celsius, humidity at 35%, and a flow rate at 180 m3/h.

The vehicle air conditioner including the subcooling heat exchanger 4 is improved in efficiency at the low target cooling temperature TEO by the subcooling heat exchanger 4. In FIG. 8, ratios of the power of the compressor 2 when the target cooling temperature TEO is at 8 degrees Celsius to the power of the compressor 2 when the target cooling temperature if at 1 degrees Celsius is described. As indicated in FIG. 8, the power required by the compressor 2 is increased by 32% when the vehicle air conditioner not including the subcooling heat exchanger 4 is operated at the target cooling temperature TEO of 1 degrees Celsius, as compared with the case where the target cooling temperature TEO is at 8 degrees Celsius. In contrast, in the vehicle air conditioner including the subcooling heat exchanger 4, the power required by the compressor 2 increases is by only 23%. In comparison to the vehicle air conditioner not including the subcooling heat exchanger 4, the vehicle air conditioner including the subcooling heat exchanger 4 is less influenced by increase in power required by the compressor 2 at the low target cooling temperature TEO.

Figure 9:
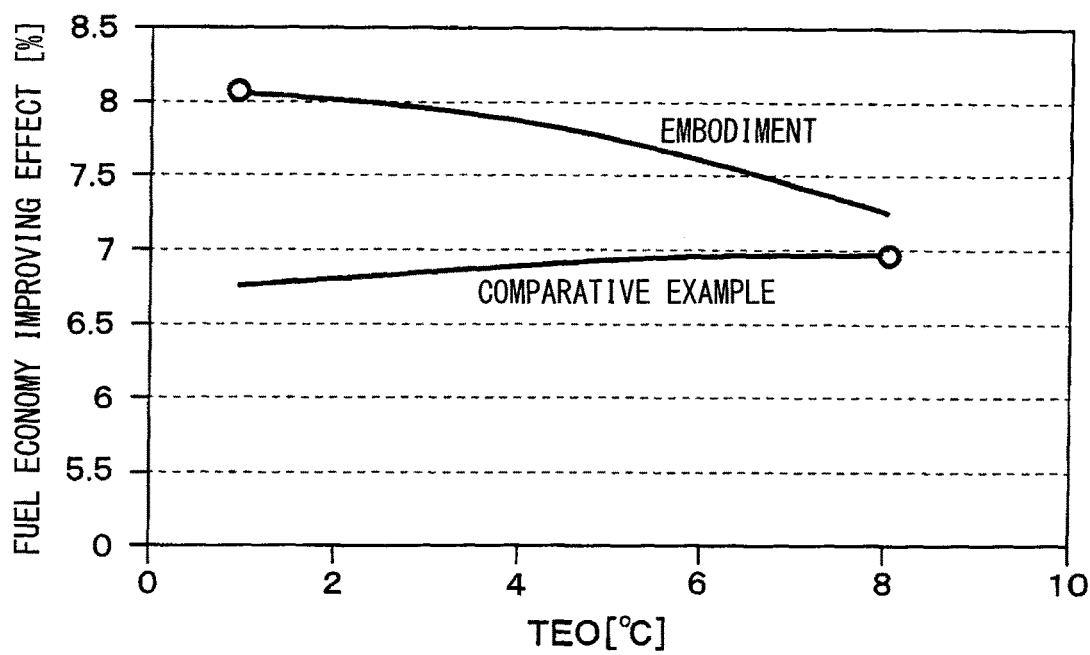
FIG. 9 is a graph illustrating relationships between the target cooling temperature TEO and an effect on improving fuel economy according to the first embodiment.

Relations between the target cooling temperature TEO and the effect on improving the fuel economy of the engine 30 will be described next with reference to FIG. 9. FIG. 9 indicates the effect on improving fuel economy of the engine 30 calculated by synthesizing the effect on improving the fuel economy of the engine 30 due to the evaporator 7 having the cold energy storage function as described with reference to FIG. 6 and the effect on saving power of the compressor 2 due to the subcooling heat exchanger 4 as described with reference to FIG. 8. In other words, the fuel economy improving effect indicated in FIG. 9 includes the fuel economy improving effect obtained from extended engine stop time by the evaporator 7 having the cold energy storage function and the fuel economy improving effect obtained through the effect on the power saving of the compressor 2 due to the subcooling heat exchanger 4. In this calculation, it is assumed that 10% of the effect on power saving of the compressor 2 contributes to the effect of improving the fuel economy of the engine 30.

FIG. 9 indicates the effect on saving power of the engine 30 with the varied target cooling temperature TEO in each of the vehicle air conditioner 100 according to the present embodiment and a vehicle air conditioner according to the comparative example. The vehicle air conditioner 100 according to the present embodiment includes the subcooling heat exchanger 4 and the evaporator 7 having the cold energy storage function. The vehicle air conditioner according to the comparative example does not include the subcooling heat exchanger 4 and includes the evaporator 7 having the cold energy storage function. FIG. 9 indicates the fuel economy improving effect of a pattern of Japanese urban district travel by a practical vehicle automatically air conditioned under the conditions of outside air temperature at 30 degrees Celsius, humidity at 50%, and solar irradiance at 500 W/m2.

As indicated in FIG. 9, in the vehicle air conditioner according to the comparative example that does not include the subcooling heat exchanger 4, the effect on fuel economy of the engine 30 becomes larger with increase of the target cooling temperature TEO. The vehicle air conditioner according to the comparative example is thus improved in fuel economy improving effect by economy control of increasing the target cooling temperature TEO.

In contrast, the vehicle air conditioner 100 according to the present embodiment including the subcooling heat exchanger 4 is improved in fuel economy improving effect of the engine 30 as the target cooling temperature TEO is lower. The vehicle air conditioner 100 according to the present embodiment operating at the low target cooling temperature TEO ordinarily leading to low efficiency achieves both quick cold energy storage of the cold energy storage material in the evaporator 7 and the fuel economy improving effect of the engine 30.

As indicated in FIG. 9, in the vehicle air conditioner 100 according to the present embodiment, the effect on improving fuel economy of the engine 30 is maximized when the target cooling temperature TEO is set to 1 degrees Celsius and the outside air temperature is at 30 degrees Celsius. The target cooling temperature TEO maximizing the effect on improving fuel economy of the engine 30 at each outside air temperature is to be set as a second target cooling temperature TEO2 described later.

The target cooling temperature TEO in relation to the vehicle air conditioner 100 according to the present embodiment will be described next. The vehicle air conditioner 100 according to the present embodiment has, as the target cooling temperature TEO, a first target cooling temperature TEO1 and the second target cooling temperature TEO2. These target cooling temperatures TEO1 and TEO2 are preliminarily set in accordance with the outside air temperature Tam or the like and are stored as control maps in the ROM of the microcomputer in the air conditioning control unit 50. The air conditioning control unit 50 functions as a target cooling temperature determiner configured to determine the target cooling temperature TEO.

The first target cooling temperature TEO1 corresponds to the target cooling temperature for ordinary economy control, and is determined in accordance with the outside air temperature Tam, a target blowing air temperature TAO, the inside air temperature Tr, the solar irradiance amount Ts, and the like. The first target cooling temperature TEO1 is set to maximize the effect on saving power of the compressor 2 by economy control. Meanwhile, the second target cooling temperature TEO2 is set to maximize the effect on improving fuel economy of the engine 30 calculated by synthesizing the effect on saving power of the compressor 2 by economy control, the effect on saving power of the compressor 2 by the subcooling heat exchanger 4, and the effect on improving fuel economy of the engine 30 by the evaporator 7 having the cold energy storage function.

Figure 10:
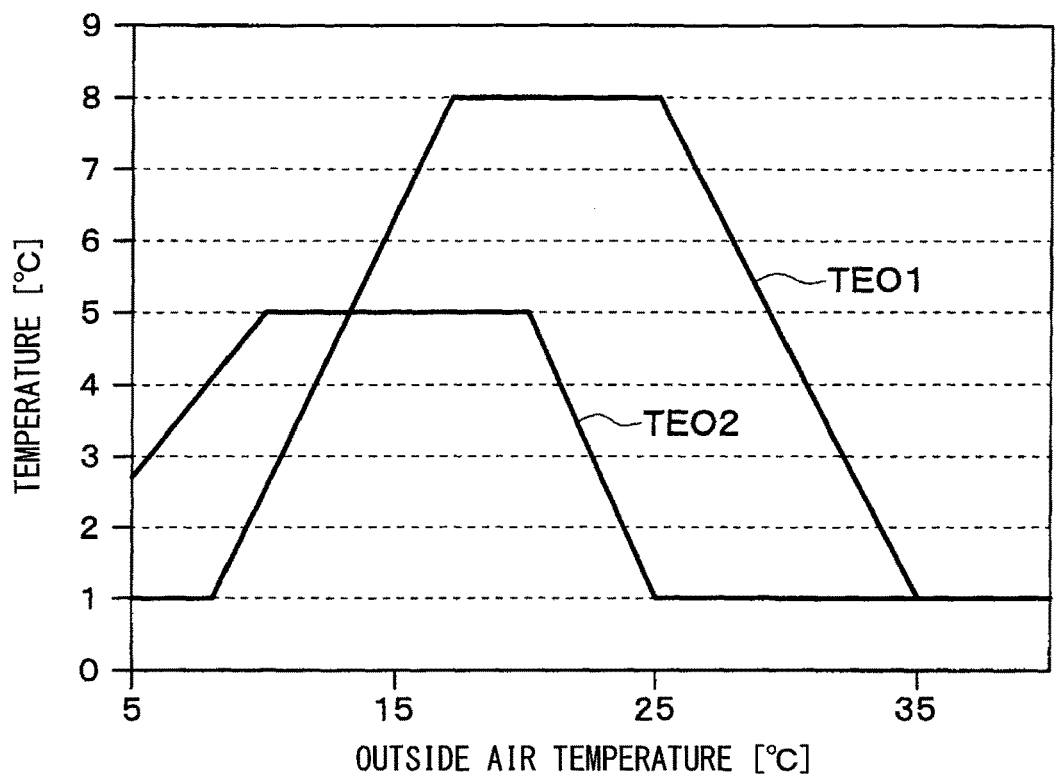
FIG. 10 is a graph illustrating relationships between the target cooling temperature TEO and a temperature of an outside air according to the first embodiment.

As indicated in FIG. 10, the first target cooling temperature TEO1 and the second target cooling temperature TEO2 are set in accordance with outside air temperature.

The first target cooling temperature TEO1 will be described initially. Air cooling and dehumidification are less needed in an intermediate temperature range (18 degrees Celsius to 25 degrees Celsius in FIG. 10, for example) of the outside air temperature TAM. The first target cooling temperature TEO1 is increased to upper limit temperature (8 degrees Celsius in FIG. 10, for example) and the compressor 1 is reduced in operation rate to save power required by the engine 30.

In a high temperature range of the outside air temperature Tam exceeding 25 degrees Celsius, the first target cooling temperature TEO1 is decreased to lower limit temperature (1 degrees Celsius in FIG. 10, for example) in inverse proportion to increase in outside air temperature Tam to secure air cooling performance. In a low temperature range of the outside air temperature Tam less than 18 degrees Celsius, the first target cooling temperature TEO1 is decreased to the lower limit temperature (1 degrees Celsius in FIG. 10, for example) in proportion to decrease in outside air temperature Tam to secure dehumidifying performance for prevention of misting window glasses.

The second target cooling temperature TEO2 will be described next. As described above, the subcooling heat exchanger 4 and the evaporator 7 having the cold energy storage function are adopted in combination to improve the power saving effect in the low range of the target cooling temperature TEO. The second target cooling temperature TEO2 thus has upper limit temperature (5 degrees Celsius in FIG. 10, for example) lower than the upper limit temperature of the first target cooling temperature TEO1 (8 degrees Celsius in FIG. 10, for example). Furthermore, the second target cooling temperature TEO2 in an intermediate temperature range (10 degrees Celsius to 20 degrees Celsius in FIG. 10, for example) of the outside air temperature Tam is lower than the first target cooling temperature TEO1 in the intermediate temperature range (18 degrees Celsius to 25 degrees Celsius in FIG. 10, for example) of the outside air temperature Tam.

The first target cooling temperature TEO1 and the second target cooling temperature TEO2 are inverted in magnitude relation at predetermined temperature (13 degrees Celsius in FIG. 10, for example). Specifically, the second target cooling temperature TEO2 is lower when the outside air temperature Tam exceeds the predetermined temperature whereas the first target cooling temperature TEO1 is lower when the outside air temperature Tam is less than the predetermined temperature.

Figure 11:
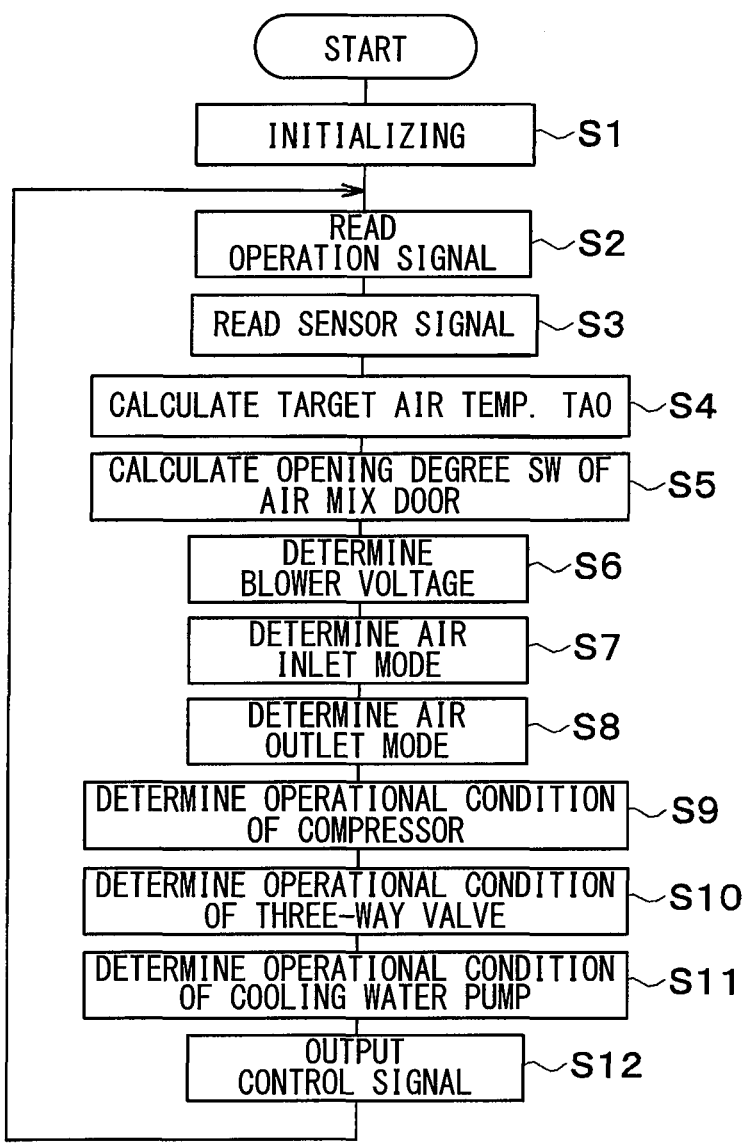
FIG. 11 is a flowchart illustrating a main routine of the air conditioning control unit according to the first embodiment.

The vehicle air conditioner 100 configured as described above according to the present embodiment will be described next in terms of operation thereof with reference to FIGS. 11 and 12. FIG. 11 is a flowchart depicting control that is main routine of the air conditioning control unit 50 according to the present embodiment. This control starts when a vehicle ignition switch is turned ON to supply direct current power to the air conditioning control unit 50.

Initially in step S1 in FIG. 11, the air conditioning control unit 50 executes initialization including initialization of a flag, a timer, and the like, and initial positioning of a stepping motor constituting the electric actuator. This initialization may be executed such that the flag or a calculated value is made equal to a value stored at the end of the latest operation of the vehicle air conditioner 100.

The air conditioning control unit 50 reads an operation signal from the operation panel 51 and the like subsequently in step S2, and the flow proceeds to step S3. Specific examples of the operation signal include a vehicle interior set temperature Tset set with use of a vehicle interior temperature setting switch, and a setting signal of an air inlet mode switch.

Subsequently in step S3, the air conditioning control unit 50 reads signals indicating vehicle environmental conditions referred to for air conditioning control, specifically, detection signals of the sensors 40 to 45, and the like. The air conditioning control unit 50 calculates the target blowing air temperature TAO of air blowing to the vehicle interior in subsequent step S4. The target blowing air temperature TAO is calculated exemplarily in accordance with the inside air temperature Tr, the outside air temperature Tam, the solar irradiance amount Ts, and the vehicle interior set temperature Tset.

In subsequent step S5 to step S11, the air conditioning control unit 50 determines control states of various devices connected to the air conditioning control unit 50. Initially in step S5, the air conditioning control unit 50 calculates a target opening degree SW of the air mix door 17 in accordance with the target blowing air temperature TAO, the cooling temperature TE detected by the evaporator temperature sensor 43, and the cooling water temperature Tw detected by the water temperature sensor 44.

Subsequently in step S6, the air conditioning control unit 50 determines air blowing performance of the blower 14 (specifically, voltage applied to the motor 14a). Then in step S7, the air conditioning control unit 50 determines the air inlet mode, specifically, a switching state of the inside-outside air switching door 13. In subsequent step S8, the air conditioning control unit 50 determines the air outlet mode, specifically, switching states of the defogger door 21, the face door 22, and the foot door 23.

Subsequently in step S9, the air conditioning control unit 50 determines an operation state of a compressor 11 (e.g. rotational speed or an ON/OFF state of the compressor 11). The operation state of the compressor 11 is determined in accordance with the cooling temperature TE, the target cooling temperature TEO of the evaporator 7, and the like.

Determination of the target cooling temperature TEO will be described below with reference to a flowchart in FIG. 12. The determination of the target cooling temperature TEO depicted in FIG. 12 is executed as part of determination of the operation state of the compressor 11 in step S9.

Figure 12:
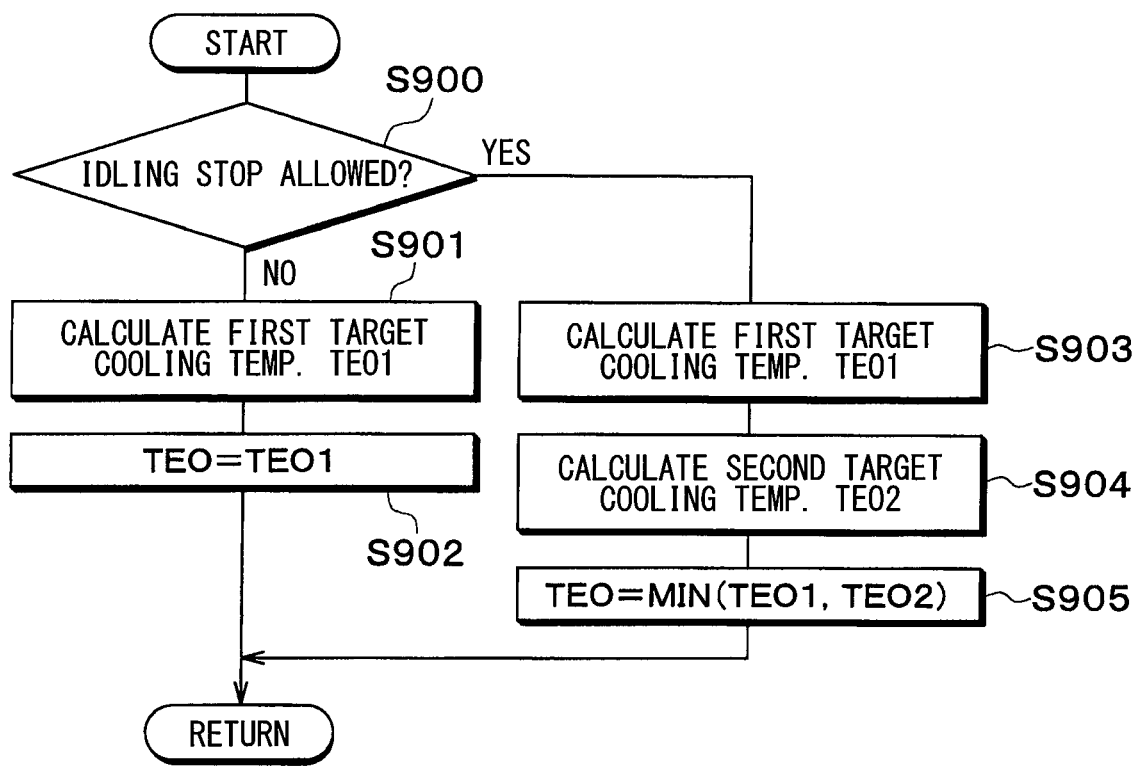
FIG. 12 is a flow chart illustrating a determination process of the target cooling temperature TEO by the vehicle air conditioner according to the first embodiment.

Initially in step S900 in FIG. 12, the air conditioning control unit 50 determines whether start-stop is allowed for execution of start-stop control. If the air conditioning control unit 50 determines that start-stop is not allowed, in other words, compressor stop control is not executed, the flow proceeds to step S901 for calculation of the first target cooling temperature TEO1. The air conditioning control unit 50 determines the first target cooling temperature TEO1 as the target cooling temperature TEO in subsequent step S902.

If the air conditioning control unit 50 determines that start-stop is allowed, in other words, compressor stop control is executed in the determination in step S900, the flow proceeds to step S903 for calculation of the first target cooling temperature TEO1. The air conditioning control unit 50 calculates the second target cooling temperature TEO2 in subsequent step S904. Subsequently in step S905, the air conditioning control unit 50 determines lower one of the first target cooling temperature TEO1 and the second target cooling temperature TEO2 as the target cooling temperature TEO.

With reference to FIG. 11 again, the air conditioning control unit 50 determines an operation state of the three-way valve 5 in step S10. Specifically, when the subcooling heat exchanger 4 heats air cooled by the evaporator 7, the three-way valve 5 switches the refrigerant flow path to the subcooling heat exchanger 4. In max cool control maximizing air cooling performance of the evaporator 7, the three-way valve 5 switches the refrigerant flow path to the refrigerant bypass passage 9a. The max cool control is executed when the cooling temperature TE of the evaporator 7 exceeds the target blowing air temperature TAO, for example.

Subsequently in step S11, the air conditioning control unit 50 determines an operation state of the cooling water pump 32. The operation state of the cooling water pump 32 is determined in accordance with whether an air heating degree of the heater core 34 needs to be changed. Change in air heating degree of the heater core 34 is determined in accordance with the cooling water temperature Tw, the cooling temperature TE of the evaporator 7, the temperature Tsc of air blowing out of the subcooling heat exchanger 4, and the like. The air conditioning control unit 50 also controls the flow rate regulator valve unit 33 as necessary to increase or decrease a flow rate of cooling water passing through the heater core 34.

Subsequently in step S12, the air conditioning control unit 50 outputs control signals and control voltage to the various devices 2, 5, 6, 13, 14, 17, 21-23, 32, 33, and the like to achieve the control states determined in step S5 to step S11. The air conditioning control unit 50 executes the control operation described above repeatedly in a predetermined cycle.

The vehicle air conditioner 100 according to the present embodiment described above includes the subcooling heat exchanger 4 configured to exchange heat to change enthalpy between refrigerant having flown out of the condenser 3 and refrigerant to flow into the evaporator 7, and the evaporator 7 configured to dissipate cold energy from the cold energy storage material while the compressor 2 stops. This configuration synthesizes the effect on improving fuel economy of the engine 30 due to the evaporator 7 having the cold energy storage function and the effect on power saving of the compressor 2 due to the subcooling heat exchanger 4, to achieve improvement in the effect on fuel economy of the engine 30 at the lower target cooling temperature TEO of the evaporator 7. The vehicle air conditioner 100 according to the present embodiment operating at the low target cooling temperature TEO ordinarily leading to low efficiency achieves both quick cold energy storage of the cold energy storage material in the evaporator 7 and the fuel economy improving effect of the engine 30.

In reheat operation in which air cooled by the evaporator 7 is heated at least with use of the subcooling heat exchanger 4, decreasing the target cooling temperature TEO leads to increase in heat dissipation amount of liquid-phase refrigerant in the subcooling heat exchanger 4. Reheating operation thus effectively achieves both quick cold energy storage of the cold energy storage material in the evaporator 7 and the fuel economy improving effect of the engine 30 at the low target cooling temperature TEO.

According to the present embodiment, lower one of the first target cooling temperature TEO1 and the second target cooling temperature TEO2 is determined as the target cooling temperature TEO when start-stop is allowed. Accordingly, the fuel economy improving effect of the vehicle is prioritized when the second target cooling temperature TEO2 is lower, whereas prevention of misting window glasses is prioritized when the first target cooling temperature TEO1 is lower.

The present embodiment also includes switching the refrigerant flow path to the refrigerant bypass passage 9a with use of the three-way valve 5 upon max cool control. This stops refrigerant from flowing from the compressor 2 into the subcooling heat exchanger 4 and inhibits increase in temperature of blowing-out air by the subcooling heat exchanger 4.

The subcooling heat exchanger 4 according to the present embodiment is located upstream of the air mix door 15 with respect to the airflow to allow air to constantly flow to the entire subcooling heat exchanger 4. The entire subcooling heat exchanger 4 can thus exert the effect of subcooling the refrigerant immediately after the three-way valve 5 switches the refrigerant flow path to the subcooling heat exchanger 4.

(Second Embodiment)

The second embodiment will be described next with reference to FIG. 13. The following description will not refer to features similar to those of the first embodiment and will refer only to features different therefrom.

Figure 13:
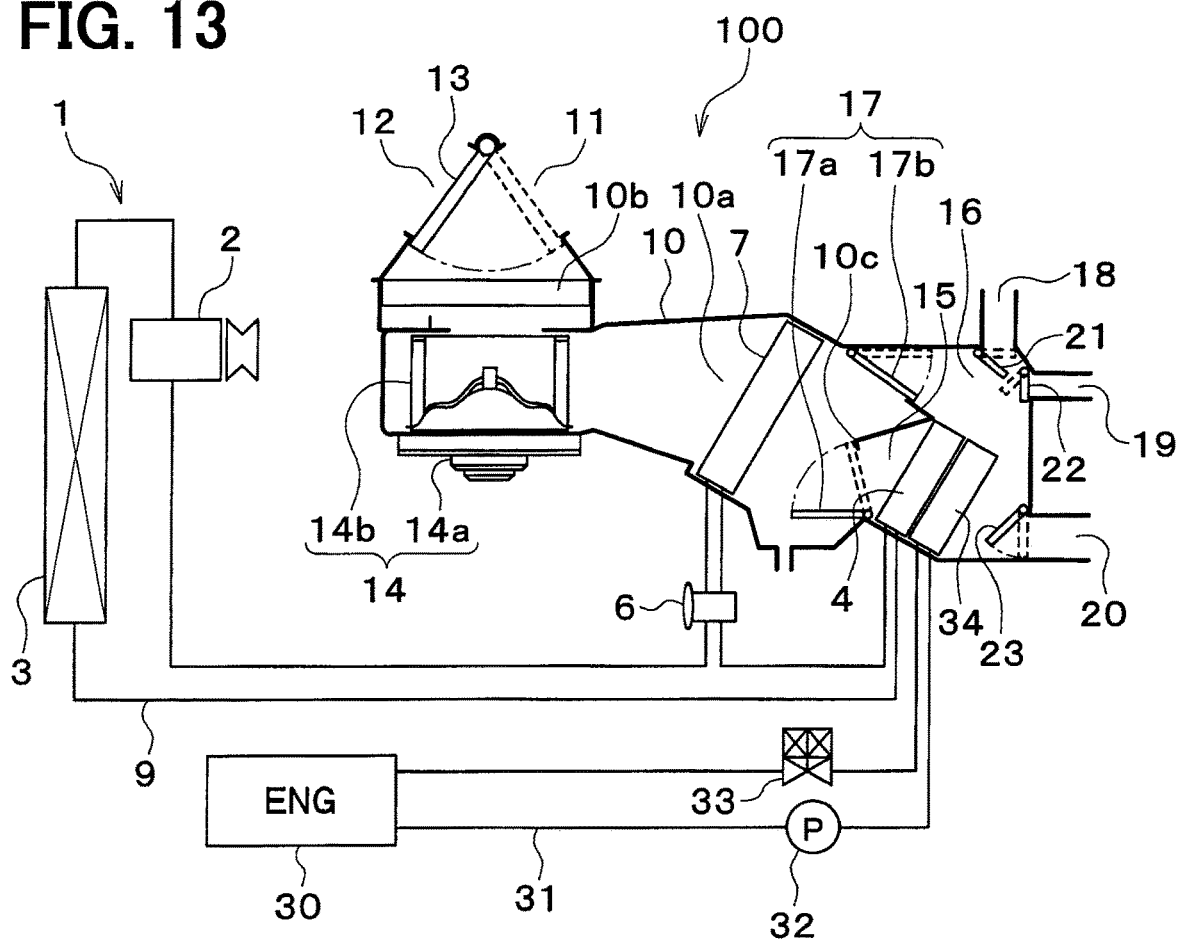
FIG. 13 is a schematic diagram illustrating a vehicle air conditioner according to a second embodiment of the present disclosure.

As depicted in FIG. 13, the subcooling heat exchanger 4 according to the present second embodiment is located downstream of the air mix door 15 and upstream of the heater core 34 with respect to the airflow. There is not provided the three-way valve 5. The subcooling heat exchanger 4 is thus constantly supplied with refrigerant discharged from the compressor 2.

In the vehicle air conditioner 100 according to the present second embodiment, the air mix door 17 allows entire air passing through the evaporator 7 to flow to the cool air bypass passage 16 in max cool operation. The air passing through the evaporator 7 thus bypasses the subcooling heat exchanger 4 and the heater core 34 for inhibition of increase in temperature of blowing-out air by the subcooling heat exchanger 4 and the heater core 34.

According to the present second embodiment described above, the subcooling heat exchanger 4 is located downstream of the air mix door 17 with respect to the airflow to achieve effects similar to those of the first embodiment without the three-way valve 5 configured to switch the refrigerant flow path to the subcooling heat exchanger 4.

(Other Embodiments)

The preferred embodiments of the present disclosure are described above. The present disclosure can be modified in various manners within the scope not departing from the gist of the present disclosure to be implemented without being limited to the above embodiments.

Figure 14:
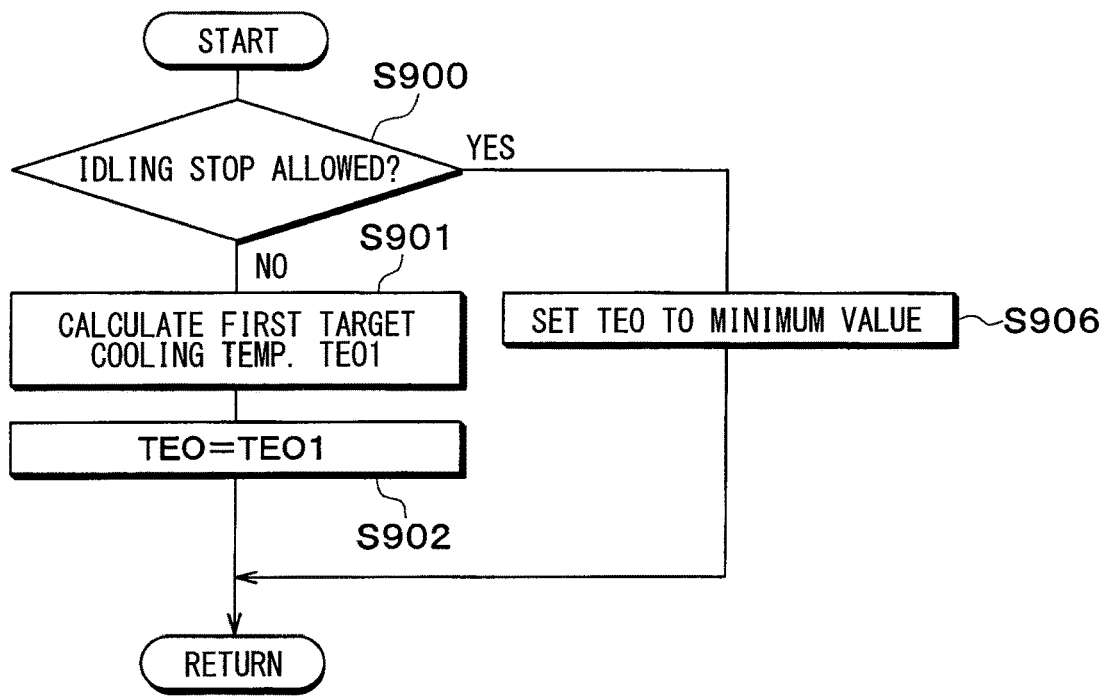
FIG. 14 is a flowchart illustrating a determination process of the target cooling temperature TEO by the vehicle air conditioner according to a modification example.

According to each of the embodiments, the first target cooling temperature TEO1 and the second target cooling temperature TEO2 are obtained and lower one is determined as the target cooling temperature TEO when start-stop is allowed. As depicted in a flowchart in FIG. 14, the target cooling temperature TEO can alternatively be determined as a settable lower limit value (e.g. 1 degrees Celsius degrees Celsius) in step S906 when start-stop is allowed. This maximizes a cold energy storage effect of the evaporator 7. Constantly adopting the lower limit value of the target cooling temperature TEO when start-stop is allowed does not require preparation of the control map of the second target cooling temperature TEO2.

The air conditioning control unit 50 according to each of the embodiments controls the air mix door 17 including the first door 17a in accordance with information received from the evaporator temperature sensor 43, the water temperature sensor 44, and the subcooling temperature sensor 45. The air conditioning control unit 50 controls the cooling water flow rate with use of the flow rate regulator valve unit 33 and the cooling water pump 32 in accordance with information received from the water temperature sensor 44 and the subcooling temperature sensor 45. Control of the air volume ratio regulator and the flow rate regulator for the heat carrier is, however, not limitedly executed in accordance with the information received from these sensors. The air volume ratio regulator and the flow rate regulator for the heat carrier can alternatively be controlled in accordance with temperature of the refrigerant entering the subcooling heat exchanger or outside air temperature relevant to the temperature of the entering refrigerant, in place of the information received from the subcooling temperature sensor 45.

The air volume ratio regulator according to each of the embodiments includes the two doors 17a and 17b, but the air volume ratio regulator is not limited to this configuration. The air volume ratio regulator may include one or at least three doors.

Each of the embodiments refers to the configuration called the auxiliary heat exchanger. The term "auxiliary" does not limitedly indicate auxiliary heat exchange smaller in amount than heat exchange executed by the remaining heat exchanger. The auxiliary heat exchanger can alternatively exchange heat larger in amount than that of the remaining heat exchanger.

Although the present disclosure has been fully described in connection with the embodiments thereof, it is to be noted that various changes and modifications will become apparent to those skilled in the art. Moreover, other combinations and configurations, including more, less or only a single element, are also within the spirit and scope of the present disclosure.

What is claimed is:

1. A vehicle air conditioner comprising:
an air conditioning duct through which air discharged to a vehicle interior flows;
a refrigeration cycle unit that includes
 a compressor configured to compress an intake refrigerant and discharge the compressed refrigerant,
 a condenser configured to condense the refrigerant discharged from the compressor by heat exchange with outside air,
 a decompressor configured to decompress the refrigerant in a liquid phase condensed by the condenser, and
 an evaporator disposed in the air conditioning duct and configured to cool the air flowing in the air conditioning duct by heat exchange with the refrigerant decompressed by the decompressor;
a heater core that is disposed in a heating passage located downstream of the evaporator in the air conditioning duct with respect to an airflow, the heater core being configured to heat the air cooled by the evaporator by heat exchange with a heat medium, the heat medium receiving heat from an internal combustion engine of the vehicle to cool the internal combustion engine;
a cool air bypass passage that is located downstream of the evaporator in the air conditioning duct with respect to the airflow, the air bypassing the heater core via the cool air bypass passage;
an air volume ratio regulator that is configured to regulate a ratio of a volume of air passing through the heating passage to a volume of air passing through the cool air bypass passage;
an auxiliary heat exchanger that is provided in the refrigeration cycle unit and configured to change enthalpy of refrigerant having flowed out of the condenser and to flow into the evaporator by heat exchange; and
a controller configured to determine a target cooling temperature that is a temperature target value of air flowing out of the evaporator, wherein
the compressor is driven by the internal combustion engine,
the evaporator includes a cold energy storage configured to store cold energy, the cold energy storage being configured to store cold energy when the compressor is in operation, the cold energy storage being configured to dissipate cold energy while the compressor stops,
the auxiliary heat exchanger is located downstream of the evaporator and upstream of the heater core in the air conditioning duct with respect to the airflow,
the auxiliary heat exchanger is configured to change enthalpy of refrigerant, which is in the liquid phase having been condensed by the condenser and to be evaporated by the evaporator, by heat exchange between the refrigerant and air having been cooled by the evaporator and to be heated by the heater core, and
the controller is programmed to:
 obtain a second target cooling temperature based on an outside air temperature, the second target cooling temperature being a temperature at which an effect on improving fuel economy of the internal combustion engine is improved, the fuel economy being calculated by synthesizing an effect on power saving of the compressor obtained when the auxiliary heat exchanger changes enthalpy of the refrigerant in the liquid phase, and an improving effect on fuel economy of the internal combustion engine obtained when the evaporator dissipates cold energy; and
 control the compressor such that temperature of the air flowing out of the evaporator is to be the second target cooling temperature.

2. The vehicle air conditioner according to claim 1, wherein
the air cooled by the evaporator is heated at least by the auxiliary heat exchanger.

3. The vehicle air conditioner according to claim 1, wherein
when the compressor stops and air passing through the air conditioning duct blows into the vehicle interior, the controller is further programmed to determine, as the target cooling temperature a lower one of the target cooling temperature and the second target cooling temperature.

4. The vehicle air conditioner according to claim 1, wherein
when the compressor stops and air passing through the air conditioning duct blows into the vehicle interior, the controller is further programmed to set the target cooling temperature as a predetermined value set as a lower limit.

5. The vehicle air conditioner according to claim 1, further comprising
a refrigerant flow path switcher configured to selectively switch a flow path between
 a flow path in which refrigerant flowing out of the compressor flows through the auxiliary heat exchanger and
 a flow path in which refrigerant flowing out of the compressor flows through a refrigerant bypass passage that bypasses the auxiliary heat exchanger, wherein
the auxiliary heat exchanger is located upstream of the air volume ratio regulator with respect to the airflow; and
when air cooled by the evaporator blows to the vehicle interior without being heated, the controller is further programmed to switch the refrigerant flow path switcher so that the flow path of the refrigerant flowing out of the compressor is connected to the refrigerant bypass passage.

6. The vehicle air conditioner according to claim 1, wherein
the auxiliary heat exchanger is located downstream of the air volume ratio regulator and upstream of the heater core in the heating passage with respect to the airflow, and
the air volume ratio regulator closes the heating passage when air cooled by the evaporator blows to the vehicle interior without heating.

7. The vehicle air conditioner according to claim 1, further comprising:
a memory that stores a control map for obtaining the second target cooling temperature, wherein
the controller is configured to obtain the second target cooling temperature by reference to the control map based on the outside air temperature.

8. The vehicle air conditioner according to claim 1, wherein
the controller is further programmed to:
 obtain a first target cooling temperature based on the outside air temperature, the first target cooling temperature being different from the second target cooling temperature;
 compare the first target cooling temperature and the second target cooling temperature to determine, as the target cooling temperature, a lower one of the first target cooling temperature and the second target cooling temperature; and control the compressor such that the temperature of the air flowing out of the evaporator is to be the target cooling temperature.

\* \* \* \* \*